US009277164B2

(12) United States Patent
Lane

(10) Patent No.: US 9,277,164 B2
(45) Date of Patent: Mar. 1, 2016

(54) APPARATUS, SYSTEM, AND METHOD FOR TAGGING OBJECTS IN A VIDEO STREAM

(76) Inventor: Mark Lane, Honolulu, HI (US)

(*) Notice: Subject to any disclaimer, the term of this patent is extended or adjusted under 35 U.S.C. 154(b) by 777 days.

(21) Appl. No.: 13/177,404

(22) Filed: Jul. 6, 2011

(65) Prior Publication Data

US 2012/0008916 A1   Jan. 12, 2012

Related U.S. Application Data

(60) Provisional application No. 61/361,822, filed on Jul. 6, 2010.

(51) Int. Cl.
*H04N 9/80* (2006.01)
*H04N 5/765* (2006.01)
*G11B 27/034* (2006.01)
*H04N 9/82* (2006.01)
*H04N 21/4722* (2011.01)
*H04N 21/81* (2011.01)
*H04N 21/858* (2011.01)
*G11B 27/30* (2006.01)

(52) U.S. Cl.
CPC .............. *H04N 5/765* (2013.01); *G11B 27/034* (2013.01); *G11B 27/3027* (2013.01); *H04N 9/8205* (2013.01); *H04N 21/4722* (2013.01); *H04N 21/812* (2013.01); *H04N 21/8583* (2013.01)

(58) Field of Classification Search
CPC ..... H04N 5/85; H04N 9/8042; G11B 27/105; G11B 27/329; G11B 2220/2562
USPC .......................................................... 386/200
See application file for complete search history.

(56) References Cited

U.S. PATENT DOCUMENTS

| 5,264,933 | A | 11/1993 | Rosser et al. |
| 5,353,392 | A | 10/1994 | Luquet et al. |
| 5,436,672 | A | 7/1995 | Medioni et al. |
| 5,488,675 | A | 1/1996 | Hanna |
| 5,543,856 | A | 8/1996 | Rosser et al. |
| 6,525,780 | B1 | 2/2003 | Bruno et al. |
| 6,864,886 | B1 | 3/2005 | Cavallaro et al. |

(Continued)

FOREIGN PATENT DOCUMENTS

| JP | 05-120290 | 5/1993 |
| KR | 10-2001-0105569 | 11/2001 |
| KR | 10-2009-0132317 | 12/2009 |

OTHER PUBLICATIONS

PCT/US2011/043080, International Search Report and Written Opinion, Feb. 23, 2012.

*Primary Examiner* — William C Vaughn, Jr.
*Assistant Examiner* — Daniel Tekle
(74) *Attorney, Agent, or Firm* — Kunzler Law Group

(57) ABSTRACT

An apparatus, system, and method are disclosed for an improved video stream. The method involves taking video of a location and mapping points of interest that are in the range of the camera. Tags are associated with various points of interest and are inserted into the video stream and displayed to the users. Tags may include advertisements and information about particular locations. In certain embodiments, proprietors pay a fee to have a tag associated with their location. The user may be able to remotely control the camera to view a particular area, with the tags appearing at appropriate locations. Video streams from numerous cameras at varying locations may be made available on a website, and end users may select the camera they are interested in and control the camera via the website.

18 Claims, 14 Drawing Sheets

(56) References Cited

U.S. PATENT DOCUMENTS

| | | |
|---|---|---|
| 7,230,653 B1 | 6/2007 | Overton et al. |
| 7,240,075 B1 | 7/2007 | Nemirofsky et al. |
| 8,332,424 B2 * | 12/2012 | Flynn et al. .................. 707/769 |
| 2005/0220439 A1 * | 10/2005 | Carton et al. .................... 386/4 |
| 2008/0071750 A1 | 3/2008 | Schloter |
| 2008/0077953 A1 | 3/2008 | Fernandez et al. |
| 2009/0232354 A1 | 9/2009 | Camp, Jr. et al. |

* cited by examiner

APPARATUS, SYSTEM, AND METHOD FOR TAGGING OBJECTS IN A VIDEO STREAM

CROSS-REFERENCE TO RELATED APPLICATIONS

This applicant claims priority to U.S. Provisional Patent Application No. 61/361,822 filed on Jul. 6, 2010 for Mark Lane and entitled "Apparatus, System, and Method for an Improved Video Stream," and which is incorporated herein by reference.

FIELD OF THE INVENTION

This invention relates to inserting information into a video stream, and more particularly relates to inserting advertisements and information into a video stream available over an Internet connection.

BACKGROUND

Travelers are often interested in getting information about destinations prior to their arrival. Various services allow users to survey their destination and acquaint themselves with an area. For example, Google offers a "street view" feature that allows users to see photos of a particular location.

However, many of these services are passive; that is, they show pictures of a location. Many users would prefer to see video of locations of interest. In addition, users may want to find information about the points of interest found within the video frame. Businesses that show up within a frame may want to advertise on sites or channels that show the video stream; other entities, such as government entities and private residences, may want to ensure that their locations are not shown on the video stream.

BRIEF SUMMARY

Presented herein is an approach to providing information to viewers of a video stream. The following summary of certain embodiments is given for convenience, and not by way of limitation.

In one embodiment, the invention is a computer program product comprising computer readable media configured to receive a video stream comprising a plurality of images of a first location taken by a camera at the first location. The computer program product may further comprise instructions for identifying a physical object at the first location that appears in the video stream and identifying a tag that is associated with the physical object. The tag may be an element that provides information about the physical object. The computer program product may also include instructions for inserting the tag into the video stream such that the tag appears to a user receiving the video stream.

Inserting the tag into the video stream may further comprise inserting the tag at a location of the physical object in the video stream. In certain embodiments, the tag is an interactive tag that provides additional information about the physical object when the interactive tag is selected by the user receiving the video stream. The tag may also provide additional information about the physical object in response to a user zooming in the tag or the physical object.

In certain embodiments, the computer program product includes instructions for receiving a plurality of video streams, where each video stream is received from a unique camera at a unique location. It may also receive directional input for the camera from a user of a remote computing device that is receiving the video stream. There may also be instructions for changing the position of the camera in response to receiving the directional input from the user of the remote computing device. The computer program product may also maintain a queue of one or more users and allowing each user in the queue to submit the directional input, wherein only one user is permitted to submit directional input to the camera at a time. Multiple objects may appear in a given video stream, and the computer program product may identify one or more tags that provide information for some of these objects.

In certain embodiments, the computer program product creates a two-dimensional representation of an area viewable by the camera at the first location and associating one or more tags with locations on the two-dimensional representation. In such an embodiment, inserting the tag into the video stream may comprise displaying the tags in the two-dimensional representation over the video stream.

The invention may be realized as a system that includes a first camera at a first location that generates a first video stream comprising a plurality of images of the first location. The system may also include a computer having a processor and memory. The computer may be configured to receive the first video stream from the first camera, identify physical objects that appear in the images of the first video stream, identify tags associated with those objects, and insert the tags into the first video stream such that the tags appear to the users watching the first video stream. The computer may also transmit the first video stream to a second remote computer used by the user watching the first video stream.

The computer may be a server that is connected to the remote computer by an Internet connection. The server may also be remote from the first camera. The system may include multiple cameras at unique locations generating video streams. The computer may receive requests to view one or more of these video streams. The computer may also provide users with a graphical user interface (GUI) that allows the user to select a video stream.

The invention may be realized as a method for providing information in a video stream. The method may comprise receiving a video stream comprising a plurality of images of a first location taken by a camera at the first location and overlaying a two-dimensional map of an area viewable by the camera over the video stream, the two-dimensional map comprising a plurality of tags at locations on the two-dimensional map associated with physical objects, wherein a tag is an element that provides information about the physical object and that appears in the video stream. The method may also involve moving the two-dimensional map in response to changes in a position of the camera such that the plurality of tags appear to users viewing the video stream at locations of associated physical objects in the video stream.

In certain embodiments, the method involves providing additional information about physical objects in response to the user zooming in on at least one of the tag and the physical object. The method may also involve adjusting the position of the tags to account for changes that result from the user zooming in the camera.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
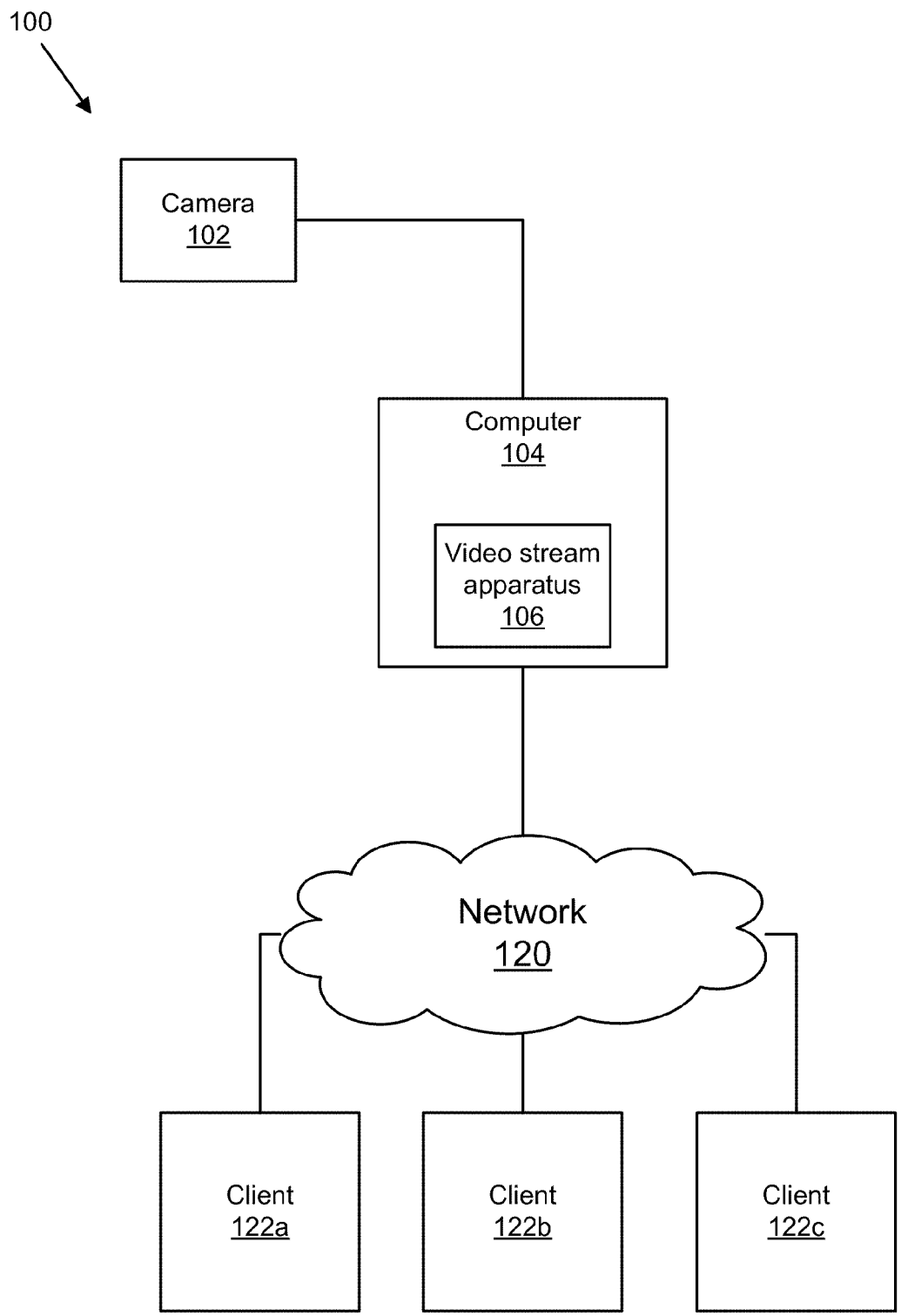
FIG. 1 is a perspective view illustrating one embodiment of a system for an improved video stream.

FIG. 1 depicts one embodiment of a system 100 for an improved video stream. In one embodiment, the system 100 includes a camera 102, a computer 104 that comprises a video stream apparatus 106, a network 120, and clients 122a-c. Other configurations and systems 100 other than the example shown in FIG. 1 are within the scope of the present invention.

The camera 102 may be a web camera, an HD video camera, a still camera, or other camera capable of capturing images that be used to create a video stream that are known in the art. The camera 102 may or may not capture audio information as well as images. The camera 102 may capture numerous images and transmit them at a frame rate that makes it appear that there is a moving picture. The frame rate and quality of the video stream presented may vary depending on the camera 102, the speed of an internet connection, or other factors. Any of various methods for capturing video using a camera 102 may be used.

In certain embodiments, the camera 102 may also send information about the position of the camera 102 and the zoom level of the camera 102 (referred to hereafter as positional information) to an attached computer 104. "Position" refers to where the camera's view is directed. The view is the image being captured by the camera 102. The camera 102's position may be anywhere within an area of the camera 102. This area may be defined by four points: the farthest left and farthest up the camera can direct its view; the farthest right and farthest up that the camera can direct its view; the farthest left and the farthest down the camera can direct its view; and the farthest right and the farthest down the camera can direct its view. Thus, the camera 102 may be positioned such that its view is a subset of a larger area that can be captured by the camera 102 if the position and/or zoom level is changed.

In certain embodiments, the camera 102 may also receive information concerning a desired position and/or zoom level from the computer 104. The camera 102 may be configured to point to the desired position, and/or zoom in or out, based on the information sent by the computer 104. The camera 102 may therefore have the physical machinery necessary to change its position without a user physically manipulating the camera 102. The camera 102 may also have software to interpret the information conveying the desired position that is received from the computer 104 and adjust its position and/or zoom level accordingly. The information conveying the desired position may originate with the clients 122a-c, as described below.

In certain embodiments, the hardware and software necessary to receive and send positional information is physically separate from the camera 102; for example, the camera 102 may be connected to a motorized tripod or other motorized camera holder. In such embodiments, the computer 104 may send positional information to the tripod and receive positional information from the tripod. The computer 104 may also be connected to the camera 102 to send and receive information concerning the zoom level. In certain embodiments, a motorized component physically adjusts the camera 102 to adjust the zoom level. For example, a motorized component may twist the lens of the camera 102 or press a button to cause the camera 102 to zoom in or zoom out.

In certain embodiments, the computer 104 is configured to provide a digital zoom feature. In such embodiments, the camera 102 may not have physical zooming capability, or the system 100 may not use the physical zooming capability of the camera 102. Instead, the computer 104 may be configured to digitally zoom in on the images captured by the camera 102. Such an embodiment may relieve the need for the computer 104 to control the zoom level and receive information about the zoom level of the camera 102. In certain embodiments, both a digital zoom and an optical zoom may be used.

In certain embodiments, the camera 102 is connected to a computer 104. The camera 102 and the computer 104 may also be physically part of the same device. The computer 104 may be a laptop, desktop computer, server, or other variety of computer. In certain embodiments, the camera 102 sends a stream of video that it captures to the computer 104. In certain embodiments, the computer 104 facilitates the transmission of the video stream over a network 120 to one or more clients 122a-c. The computer 104 may use any of the numerous possible approaches to streaming video over a network 120.

In certain embodiments, the computer 104 includes a video stream apparatus 106. The video stream apparatus 106 modifies the video stream received from the camera 102. In certain embodiments, the video stream apparatus 106 also provides a digital zoom feature. The video stream apparatus 106 may insert information in the form of tags 206 into the video stream received from the camera 102. The computer 104 may then feed that video stream over the network 120 where it can be received by one or more clients 122a-c. Known protocols and approaches to streaming video may be used to communicate the video stream over the network 120. The video stream apparatus 106 may also allow clients to adjust the video stream quality and/or frame rate. The video stream apparatus 106 may allow the user to adjust the frame rate and/or quality; for example, a user with a slow connection over the network 120 may select a low frame rate or quality.

In certain embodiments, the video stream apparatus 106 inserts tags that provide information into the video stream. The information may be relevant to the images and/or audio captured by the camera 102. In one embodiment, the information comprises advertisements. In certain embodiments, the advertisements are connected to locations or items represented by physical objects within the video stream. For example, the information may include the name and phone number of a business whose building is shown in video stream. The information may also include a coupon for a business that is shown in the video stream. The video stream apparatus 106 may cause this information to be inserted into the video stream such that it is displayed for users at a location that corresponds to the location of the particular business. This is discussed in greater detail in the example shown in FIGS. 2a and 2b.

In certain embodiments, the video stream apparatus 106 receives positional information from one or more clients 122a-c. The video stream apparatus 106 may thus allow clients 122a-c to control the positioning and zoom level of the camera 102. In certain embodiments, the clients 122a-c comprise software that allows the users to send positional information to the video stream apparatus 106. In other embodiments, the software may be realized in a browser operating on one or more clients 122a-c, with the software allowing the users to send positional information being implemented on a remote server. The server may be the computer 104, or may be implemented in another location on the network 120.

In certain embodiments, a remote server exists on the network 120 and connects with multiple clients 122a-c and multiple computers 104, each of which is connected to a camera 102. In such an embodiment, the remote server may have access to multiple video streams for multiple locations, and may make those video streams available to multiple clients 122a-c. The users of the clients 122a-c may choose which, of the many video streams made available by the remote server, they wish to view. The remote server may also implement a queue or system whereby clients 122a-c take turns controlling the camera 102 by sending positional information, such that the camera 102 is under the control of only one client 122a-c at any particular time. The remote server may allow each client 122a-c a certain amount of time to control the camera 102 if there are a number of users of clients 122a-c that all wish to control the camera 102.

The clients 122a-c are computers that connect to the network 120 and are capable of displaying video. The clients 122a-c may be, for example, computers such as laptops, desktops, mobile phones, other mobile devices, televisions, or similar devices that are capable of receiving and displaying a video stream. The clients 122a-c may be operated by a user. In certain embodiments, as noted above, the user may select which video stream to view, and may send a remote camera 102 positional information and thereby control where the camera 102 is pointing and what is presented in the video stream.

The network 120 is a combination of hardware and software that facilitates information sharing between connected entities, such as the clients 122a-c and the computer 104. The network may comprise gateway devices, routers, servers, Ethernet cabling, and other physical components. The network 120 may be a LAN, a WAN, or other variety of network 120. In one embodiment, the network 120 provides a connection to the Internet.

While FIG. 1 shows the video stream apparatus 106 on a computer 104 connected directly to the camera 102, the video stream apparatus 106 may also be located at different locations within the system 100. For example, the video stream apparatus 106 may be located on the remote server. In such an embodiment, the remote server may receive the video stream from the computer 104 that is connected to the camera 102 and insert tags into the video stream on the remote server. In certain embodiments, the video stream apparatus 106 may be distributed among a plurality of computers that are in communication with each other in the system 100.

Figure 2A:
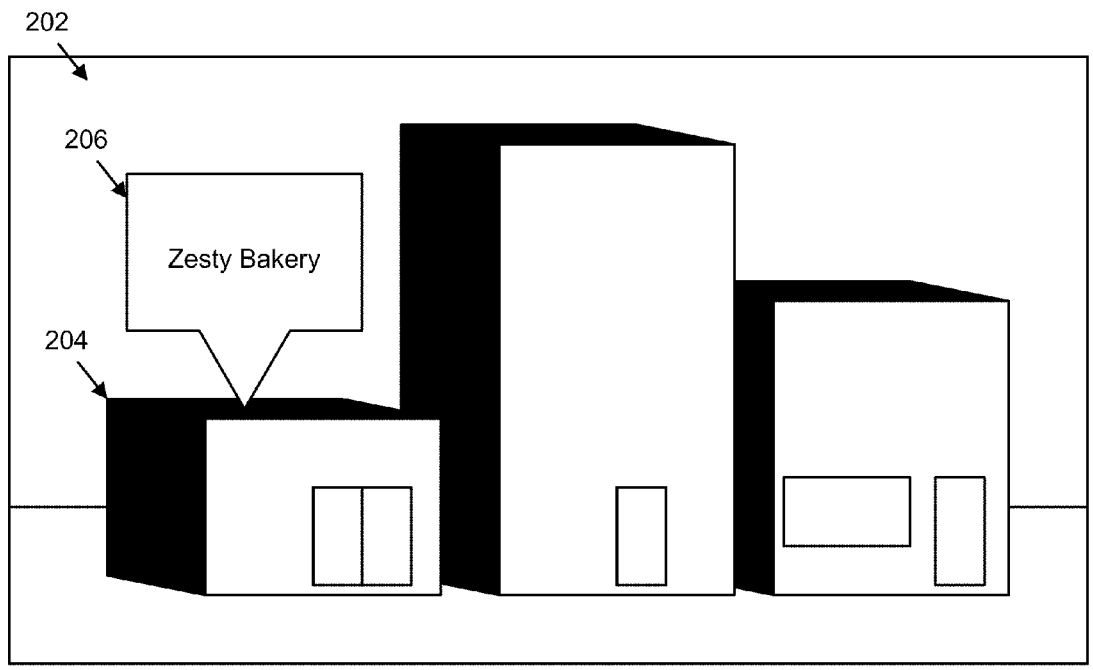
FIGS. 2a and 2b are example illustrations of an improved video stream.
Figure 2B:
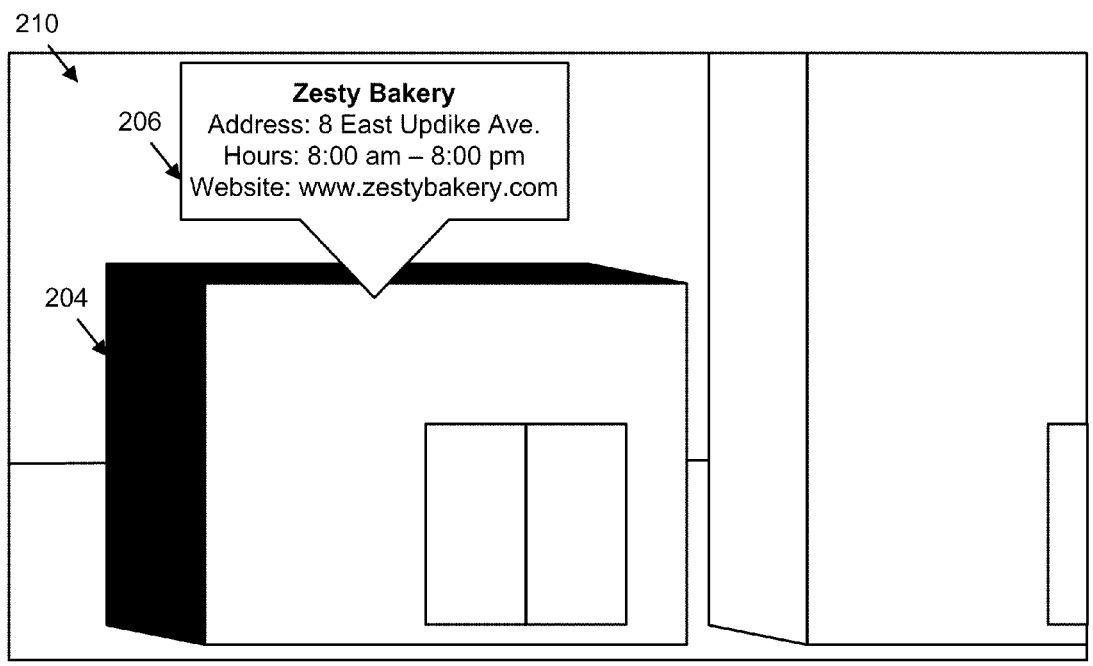

FIGS. 2a and 2b are exemplary embodiments of an enhanced or augmented video stream. An additional example is shown in FIGS. 7 through 12. FIG. 2a shows one embodiment of a video stream that may be captured by a camera 102. In this example, the video stream captures three buildings in the frame 202. In the depicted example, a building 204 is included in the frame 202.

The video stream apparatus 106 may insert information into the frame 202 for presentation to a user of a client 122a-c. For example, the video stream apparatus 106 may insert a tag 206 into the frame 202. The tag 206 is an element that appears in the video stream and provides information about a particular item appearing with the video stream. The tag 206 may be visual, audio, or both. The particular item referenced within the video stream may be visual, audio, or both. In certain embodiments, the tags 206 are generated by the creators of the video stream apparatus 106 (i.e., the developers). In other embodiments, the tags 206 are generated and submitted by users. In certain embodiments, both user-generated and developer-generated content is used in the tags 206.

The tag 206 may provide a variety of information concerning the building 204. In the example in FIG. 2a, the tag 206 shows the name of the business. In certain embodiments, businesses and/or individuals may pay to have tags 206 appear in the video stream created by a camera 102 at locations or in connection with events that are associated with their business. For example, the owner of the Zesty Bakery may pay to have the tag 206 appear in the video stream. In certain embodiments, the revenues from advertisements are split between a company implementing a system (such as system 100) and the proprietors of locations that place and maintain the camera 102.

The information displayed in the tag 206 may vary from business to business. In certain embodiments, a business paying for the tag 206 to appear can dictate what type of information appears in the tag 206. The tag 206 may also change its appearance based on the background in the video stream; for example, the tag 206 may change color based on the time of day. Thus, white text (as opposed to black text) may be used at night. The tag may be displayed in a color that makes the information easy to read over the background. For example, light text colors are used when dark buildings are in the background. In other embodiments, the color of the tag (as opposed to the color of the text) may change based on the background in the video stream.

The tags 206 may be placed at or near a particular location captured in the video stream. Such placement may be appropriate when the tag is associated with a physical location, such as a building. Tags 206 may also be placed based on other considerations. Tags 206 may be placed to appear over existing advertisements. For example, an advertisement on a billboard may be replaced with a tag 206. Similarly, ads on benches may be replaced with tags 206. The ads that the system 100 places on benches and billboards may be for products that do not have an inherent physical location; for example, tags 206 advertising a particular brand of beverage, or a household cleaner, may be inserted over a billboard.

The tag 206 may provide a variety of different types of interaction. A user may be able to click on certain tags 206 to close them. The user may not be permitted to close other tags 206, such as those obscuring sensitive locations. Clicking on a tag 206 may cause the tag 206 to expand, showing additional information. Clicking on a tag 206 may open a new browser window on the client 122*a-c* that opens to the business's website. A tag 206 may contain a number of hyperlinks which the user can select. A tag 206 may provide the user with directions from his or her location (or a location of the user's choosing) to the business or location associated with the tag 206. The tag 206 may be equipped to allow the user to print a coupon by clicking on the tag 206 or a link within the tag 206.

Tags 206 may also be used to obscure sensitive locations that may otherwise appear within a frame 202 of the video stream. For example, it may be desirable to obscure a government building or a private residence. A tag 206 may be placed over a sensitive location to prevent the location from appearing within the frame 202 of a video stream. The tag 206 may be an advertisement, an image, a box, or other element capable of obscuring the sensitive location. Such a tag 206 may be referred to as a privacy tag 206. The privacy tag 206 may be inserted into the video stream such that the privacy tag 206 covers the sensitive object and obscures the sensitive object. By obscuring the sensitive object, the user viewing the video stream cannot see the sensitive object beneath the privacy tag 206. The privacy tag 206 may be, for example, opaque. The privacy tag 206 may be semi-transparent, but may distort the sensitive object beneath the privacy tag 206. Other ways in which the privacy tag 206 may obscure the sensitive object may also be used. The user viewing the video stream may not be permitted to close the privacy tag 206, move the privacy tag 206, or otherwise manipulate the privacy tag 206 to show the underlying sensitive object. The video stream apparatus 106 may move the privacy tag 206 in response to a user changing the position of the camera 102 in order to ensure that the sensitive object is always covered by the privacy tag 206.

In certain embodiments, the information displayed in a tag 206 may also be keyed to a zoom level. FIG. 2*b* shows a frame 210 which is zoomed in from the image in frame 202. The tag 206 now displays greater detail about the business associated with the building 204. The tag 206 may display, for example, an address, a phone number, hours of operation, a website address, a menu, or other information.

Figure 3A:
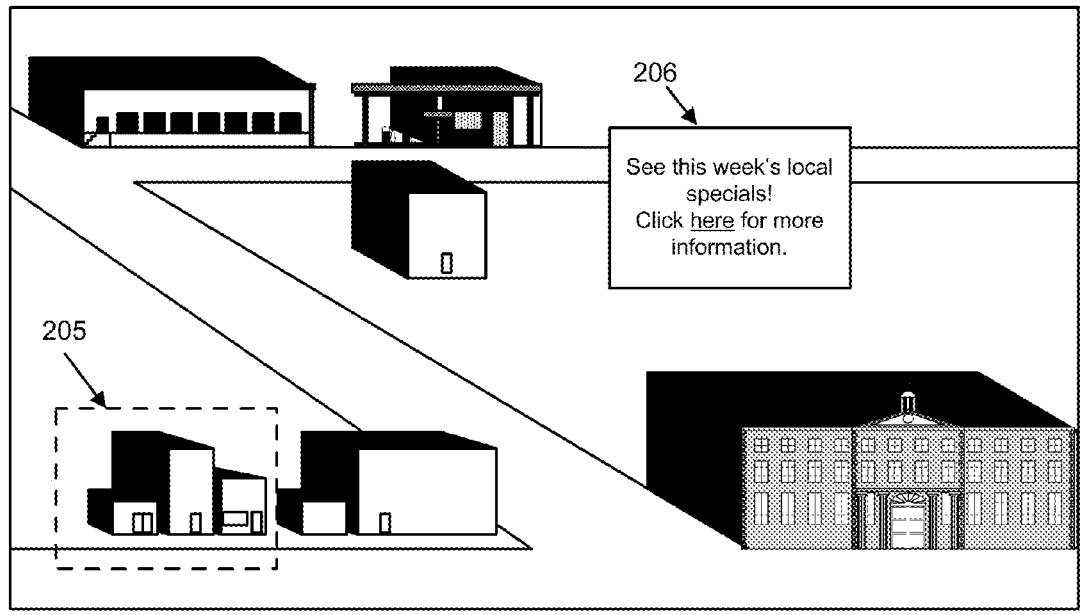
FIG. 3a is one embodiment of a tag blocking restricted content.
Figure 3B:
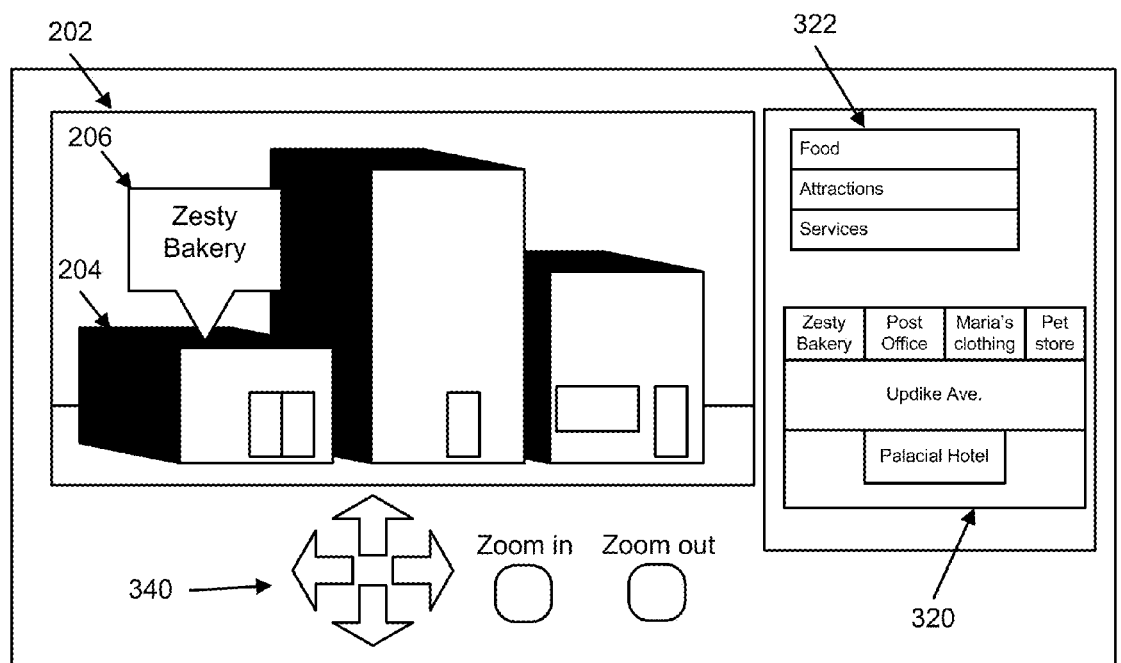
FIG. 3b is one embodiment of a presentation screen for an improved video stream.

FIG. 3*a* shows a second perspective of the scene in FIGS. 2*a* and 2*b*, but with the camera 102 zoomed out farther. As can be seen in comparison with FIGS. 2*a* and 2*b* (and FIG. 3*b*), the image in FIG. 3*a* is a superset of that shown in FIGS. 2*a*, 2*b*, and 3*b*. The view represented in FIGS. 2*a*, 2*b*, and 3*b* is marked 205 in FIG. 3*a*. In addition, FIG. 3*a* shows how a tag 206 may be used to obscure a sensitive location. A sensitive location may be any location that the designer or manager of the system providing the video stream determines should not be shown to the viewer. The tag 206 in FIG. 3*a* may, for example, be placed over a private residence. The end user may not be given the ability to remove or close the tag 206 since it obscures a sensitive location. In this manner, privacy issues can be addressed effectively. This approach may further provide additional opportunities for advertising.

FIG. 3*b* shows one embodiment of a presentation screen 310 that may be displayed for a user on a client 122*a-c*. In one embodiment, the presentation screen 310 is part of software that is installed and operating on the client machine 122*a-c*. In other embodiments, the presentation screen 310 is part of a browser window on the client machine 122*a-c*, and the information about the organization, content, and presentation of the information in the presentation screen 310 is sent to the browser from a remote server.

In one embodiment, frames 202 are presented in succession to the user as part of the video stream. Different approaches for presented a video stream may be used. For example, in one embodiment, the video stream is in motion JPEG (MJPEG) format that presents a sequence of separately compressed JPEG images. In another embodiment, the video stream is presented in other formats (such as MPEG-2, JPEG 2000, H.264/MPEG-4 AVC, or others). The tags 206 are inserted into the video stream. In certain embodiments, the tags 206 are inserted into the video stream prior to the stream reaching the clients 122*a-c*. In other embodiments, the tags 206 are not inserted into the video stream directly; rather, the tags 206 may be superimposed over the video stream. The tags 206 may then be overlaid on the video stream to present an image such as that shown in FIG. 3*b*. Other approaches, in addition to the ones explained above, may be used to insert the tags 206 into the video stream.

Other information and navigation tools may also be presented to a user on a client 122*a-c*. For example, the presentation screen 310 may provide the user with the ability to control the camera 102. In one embodiment, the user may click to zoom, and scroll left-right or up-down to control the camera 102. In other embodiments, the presentation screen 310 may include controls (such as directional arrows and a zoom button) to control the camera 102. FIG. 3*b* shows, at 340, examples of controls that a user may use to direct the camera 102. The user may be presented with arrows to control the direction of the camera, along with buttons to zoom in and/or out. Other interfaces may be presented to a user to allow the user on the client 122*a-c* to control a camera 102.

The presentation screen 310 may also include a map 320. In certain embodiments, the map 320 contains all points of interest within the range of the camera 120. In certain embodiments, only those buildings housing businesses that have paid to advertise appear in the map 320. The map 320 may be interactive; in one embodiment, a user may click on a particular point in the map (for example, the pet store) and the camera 102 will position itself to capture that point on the map, and present one or more tags 206 associated with that particular position. This may be an additional way of controlling the camera 102.

The presentation screen 310 may also include a list 322 that contains categories of businesses, products, and services which may be of interest. In certain embodiments, only those businesses that have paid to advertise appear in the list 322. In certain embodiments, if a user selects a particular category, all relevant businesses in that category are listed. For example, selecting "food" may result in all locations within the range of the camera 102 that offer food being listed. If a user selects a particular location from the list (for example, a particular business name), the camera pans to that location.

In certain embodiments, another panel is shown in the presentation screen 310. The panel may display information about what is currently included in the camera 120's view. The user may thus easily determine what he or she is looking at. In certain embodiments, if the user positions his or her cursor over an item in the video stream, the name of that particular item appears in the panel.

In certain embodiments, the user may choose to have a tag 206 disappear. For example, a user may determine that a particular tag 206 is obscuring another item that the user wishes to examine. The tags 206 may have an "x" in one corner, which causes the tag 206 to close if the user selects the "x." In certain embodiments, the tags 206 fade and disappear on their own after a given period of time passes. Other approaches to temporarily remove a tag 206, or to allow a user to close a tag 206, may be used.

Figure 4:
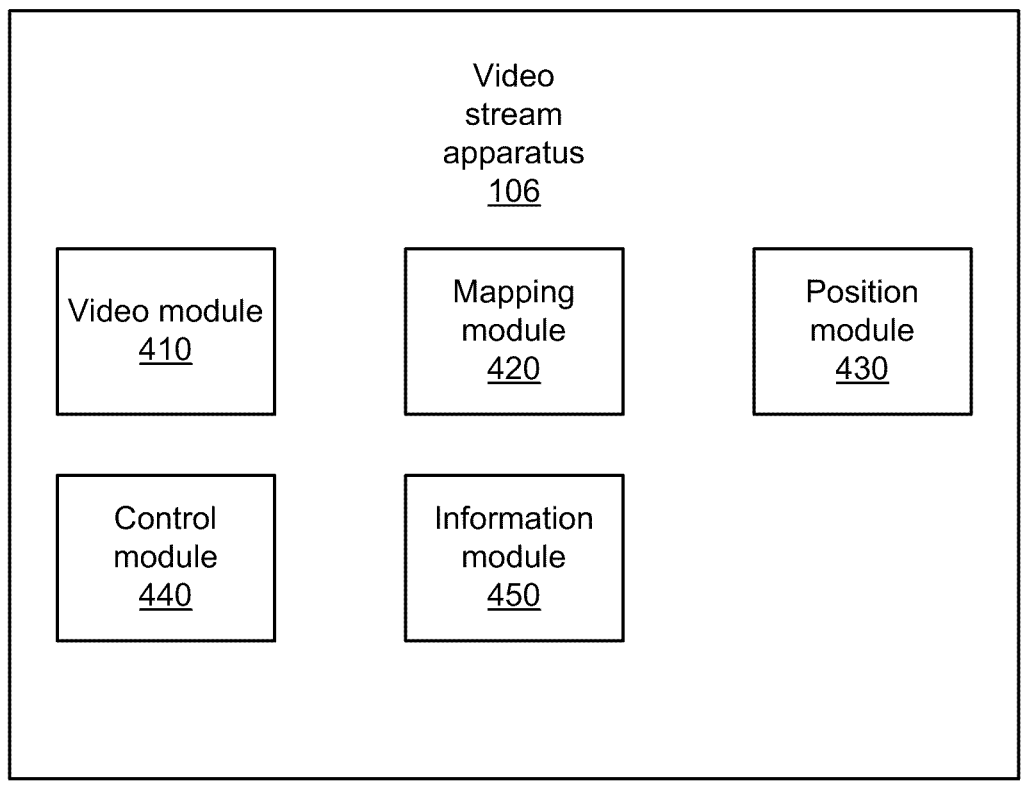
FIG. 4 is one embodiment of a video stream apparatus for an improved video stream.

FIG. 4 shows one embodiment of a video stream apparatus 106. In one embodiment, the video stream apparatus 106 includes a video module 410, a mapping module 420, a position module 430, a control module 440, and an information module 450. In one embodiment, the video module 410 receives data from a camera 102 and prepares the data for transmission to one or more destinations. In one embodiment, the destination is one or more clients 122*a-c*. In certain embodiments, the video module 410 is responsible for encoding the video stream after additional information (such as tags 406) has been added. The video module 410 may be responsible for inserting the tags 206 into the video stream based on information provided by the modules described below. The video module 410 may insert the tags 206 into the video stream using a variety of approaches. In certain embodiments, the video module 410 inserts the tags 206 into the frames that make up the video stream. In certain embodiments, the video module 410 generates a separate layer to be shown over the video stream, which layer includes the tags 206.

The video module 410 and other modules described below may all be implemented in the same physical location, or distributed through a system 100. In certain embodiments, the tags 206 are inserted into the video stream at the camera 102. The tags 206 may be inserted into the video stream at an intermediate point, such as the computer 104 or on a server in the network 120. For example, a web server on the network 120 that hosts a website from which a user can select videos may insert the tags 206 into the video stream. In other embodiments, the tags 206 are inserted into the video stream at the client 122*a-c*.

The video stream apparatus 106 may also include a position module 430 that retrieves position information from the camera 102. The position information may include where the camera is pointing in three-dimensional space. In certain embodiments, the position module 430 receives this information from the camera 102. In other embodiments, the position module 430 may receive position information from a mechanical holder (such as a tripod) that positions the camera 102. In certain embodiments, the position module 430 may communicate with the camera 102 and a mechanical holder in order to receive position information. As noted above, position information may include a zoom level for the camera 102.

The video stream apparatus 106 may also include a mapping module 420 that identifies what items are in the video stream and where such items are located in one or more rames of the video stream. In certain embodiments, the mapping module 420 includes one or more data structures that map particular positions to particular items of interest, such as businesses. In one embodiment, the mapping module 420 uses a table of positions, where each entry in the table is associated with one or more items of interest. The table may also specify where the items of interest are located in the frame when the camera 102 is at a particular position.

The mapping module 420 may also make use of a grid that outlines all possible positions for the camera, and notes where items of interest are located relative to the positions. Other data structures could also be used to associate camera positions with items of interest. Examples of an approach to mapping tags 206 to the video stream are given below. In certain embodiments, the mapping module 420 may use software to dynamically identify different items of interest in the video stream. For example, the mapping module 420 may use a pattern recognition algorithm such as the Burt Pyramid to recognize specific items of interest. In certain embodiments, the mapping module 420 uses a combination of pattern recognition algorithms and data structures to identify items of interest.

For example, a mapping module 420 may use data structures to identify relatively static and stationary components of the video stream such as buildings, benches, and billboards. Pattern recognition algorithms may be used to identify dynamic, moving components of the video stream such as cars. Certain advertisements may be tied to dynamic elements; for example, a car manufacturer may want tags to appear when one of their cars drives through the video stream.

The mapping module 420 may contain the x, y, and z coordinates of all locations that can be seen with the camera 102 and that should have tag 206. In certain embodiments, this information is entered by a user setting up the system 100. The mapping module 420 may also specify the optimal placement of tags 206 relative to the locations that should have a tag 206 and other background features.

In certain embodiments, the camera 102 is fixed to a particular physical location. In such embodiments, the items within the range of the camera 102, and the position of items of interest relative to the position of the camera 102, are constants. Thus, the mapping module 420 may indicate where items of interest are located relative to the current position and/or zoom level of the camera 102 without having to account for the possibility of changes in the location of the camera 102 itself, and how such changes will affect the locations of items of interest, as stored by the mapping module 420. In embodiments which use pattern recognition algorithms, the camera 102 may not need to be fixed to a particular location. In other embodiments, the mapping module 420 can account for changes in the location of the camera 102 and adjust the stored locations of the items of interest accordingly.

The above are examples of ways in which a mapping module 420 may identify the physical objects that appear in the video stream. In certain embodiments, the physical objects are identified in real-time using pattern recognition algorithms. In certain embodiments, the physical objects are identified when the camera 102 is initially configured using representations of the area that the camera 102 can view. The representations may be three-dimensional maps, two-dimensional maps, data structures storing location information, or other approaches to representing an area.

The video stream apparatus 106 may also include a control module 440. In certain embodiments, the control module 440 allows a user on a client 122a-c to re-position the camera 102 over a remote connection. For example, the user may want the camera 102 to pan to the left, pan up, or zoom in on a particular point. The control module 440 may receive control information from clients 122a-c and adjust the camera 102 accordingly. In certain embodiments, the control module 440 translates the control information received from the clients 122a-c into a format that the camera 102 can understand and implement. The control information may be received via an intermediate remote server.

In certain embodiments, the control module 440 maintains a queue of clients 122a-c that wish to control the camera 102. In certain embodiments, the control module 440 allows each client 122a-c exclusive control of the camera 102 for a defined period of time. Once the client 122a-c has had control of the camera 102 for the allotted time, the next client 122a-c in the queue is given control of the camera 102. All clients 122a-c may be allowed to see the video stream even when the camera 102 is being controlled by another client 122a-c.

The video stream apparatus 106 may also include an information module 450. The information module 450 may determine what tags 206 are associated with the items captured by the camera 102, and where those tags 206 should be located in the video stream. In certain embodiments, the information module 450 uses the position information gathered by the position module 430 to determine what items (such as buildings) are currently in the frames captured by the camera 102. The information module 450 may also use the mapping module 420 to determine what tags 206 are associated with this particular position and to determine where those tags 206 should be placed in the frame. As discussed above, the tags 206 may be advertisements, coupons, images for obscuring sensitive locations, or other information. The tags 206 may also be text, hyperlinks, audio, video, or other type of media. In certain embodiments, the user setting up the system 100 defines what information appears in the tags 206. In this manner, and others, the information module 450 may identify the tags 206 that are associated with the physical objects in the video stream.

The video stream is thus presented to users with tags 206 that may include information, advertising, and valuable content for users of clients 122a-c. Users may thus gain greater information about a particular location, and businesses in the vicinity of the camera may be able to reach potential customers. In addition, the user is dynamically engaging with the presented information. This is of particular importance to advertisers. In addition, advertisements placed within the video stream as described above may be insulated from ad-blocking software running on a client 122a-c. This approach may therefore be used to ensure more effective delivery of advertising material to users.

Figure 5:
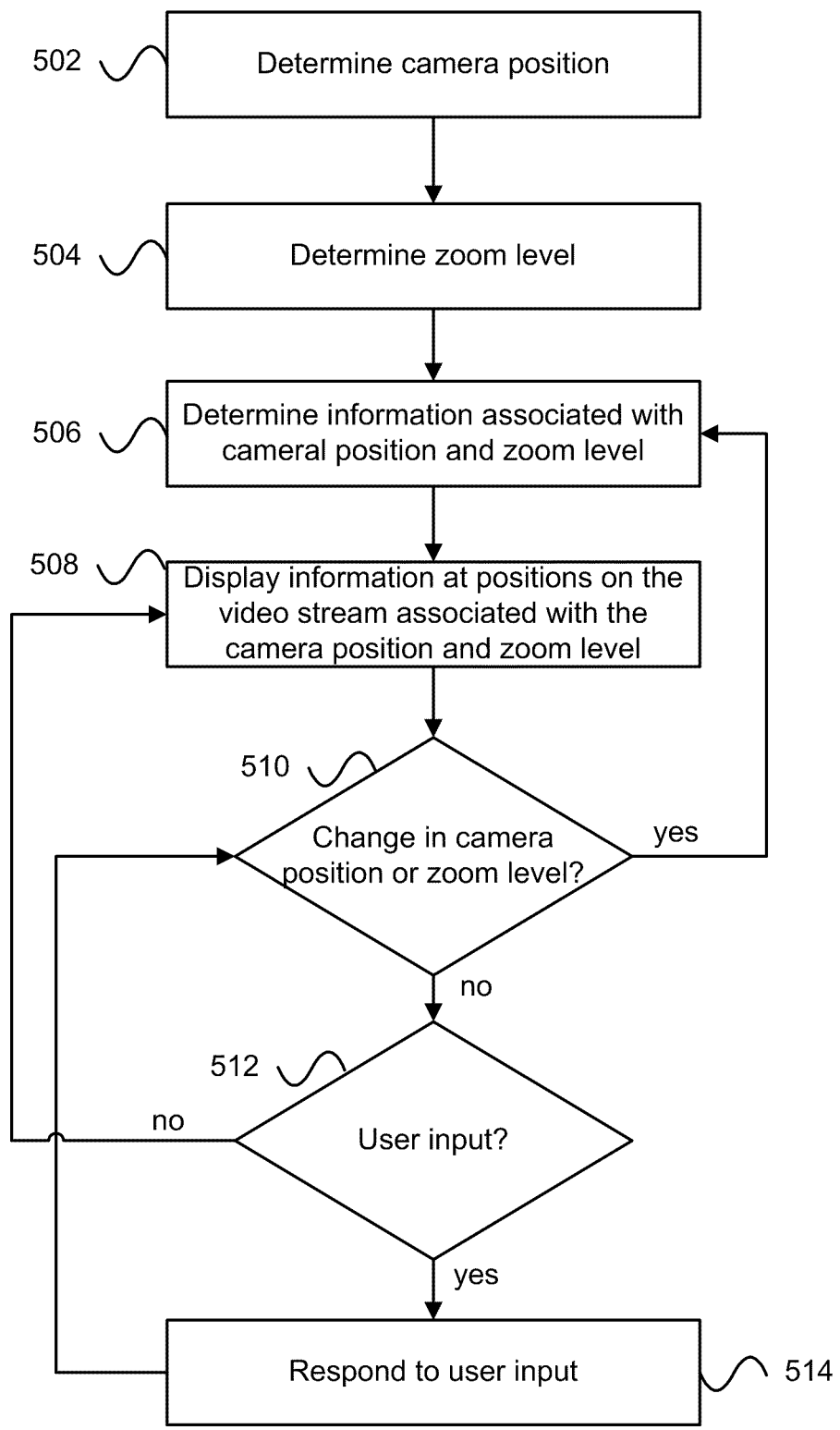
FIG. 5 is an illustrative flow chart diagram showing one embodiment of a method for generating an improved video stream.

FIG. 5 is a flow chart diagram showing one embodiment of a method for augmenting a video stream. The steps shown in FIG. 5 need not occur in the order shown. The method may begin with determining 502 a position of the camera 102. As noted above, the method may also include determining 504 the zoom level of the camera 102. The method may also include determining 506 what information is associated with the camera position and the zoom level. For example, as explained above, certain advertisements or information about particular businesses may be associated with the camera 102 position and zoom level.

The method may also include displaying 508 the information (such as tags 206) associated with the camera position and zoom level. The information may be assigned particular positions in the video stream, which positions are determined to correspond to the information. The correspondence may be made, in certain embodiments, by a developer or a user of the software who associates the information with the location. As shown in the example of FIGS. 2a and 2b, the tag 206 may be placed at a point that corresponds to the physical location of the business associated with the tag 206.

The method may involve determining 510 whether there has been a change in the camera position or the camera zoom level. If there has been a change, then the information associated with the camera position and zoom level are again determined for the new position and/or zoom level and displayed in the video stream. The method may also involve determining 512 whether there is any user input. For example, commands from a user that he or she wishes to move the camera to a new position may constitute user input. Other examples include, as mentioned above, a user selecting an item of interest from a map. The method then involves responding 514 to the user input, which may necessitate finding the information that is associated with a new position and/or zoom level resulting from the user input.

Figure 6:
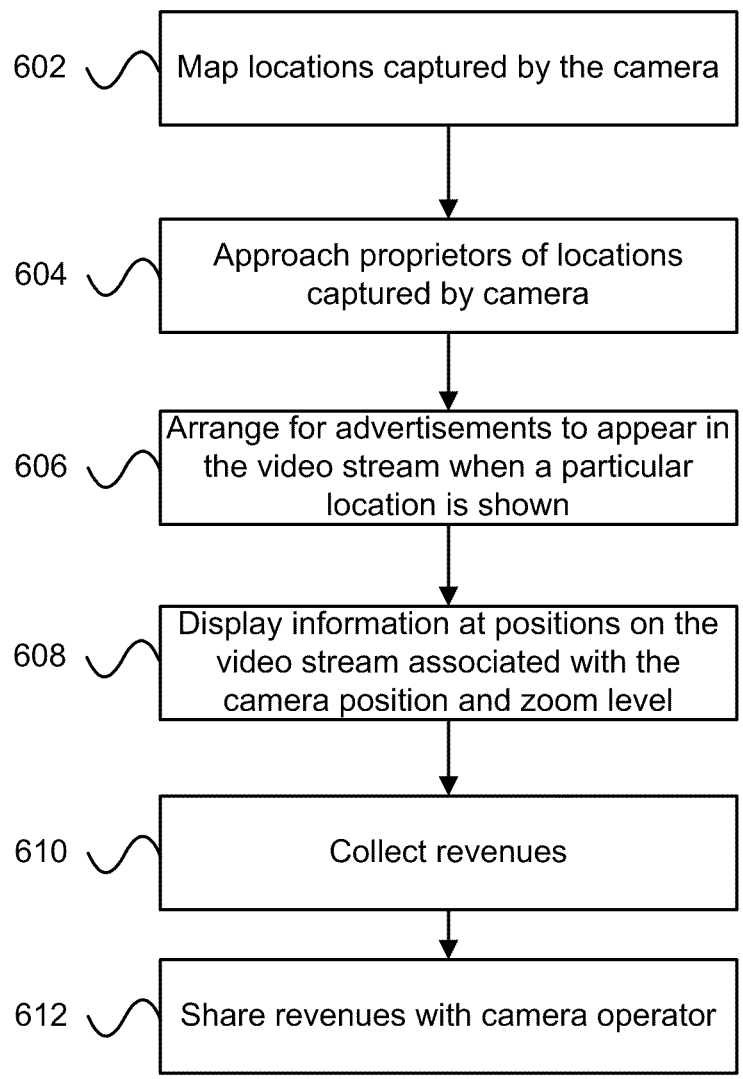
FIG. 6 is an illustrative flow chart diagram showing one embodiment of a method for generating revenue from an improved video stream.
Figure 7:
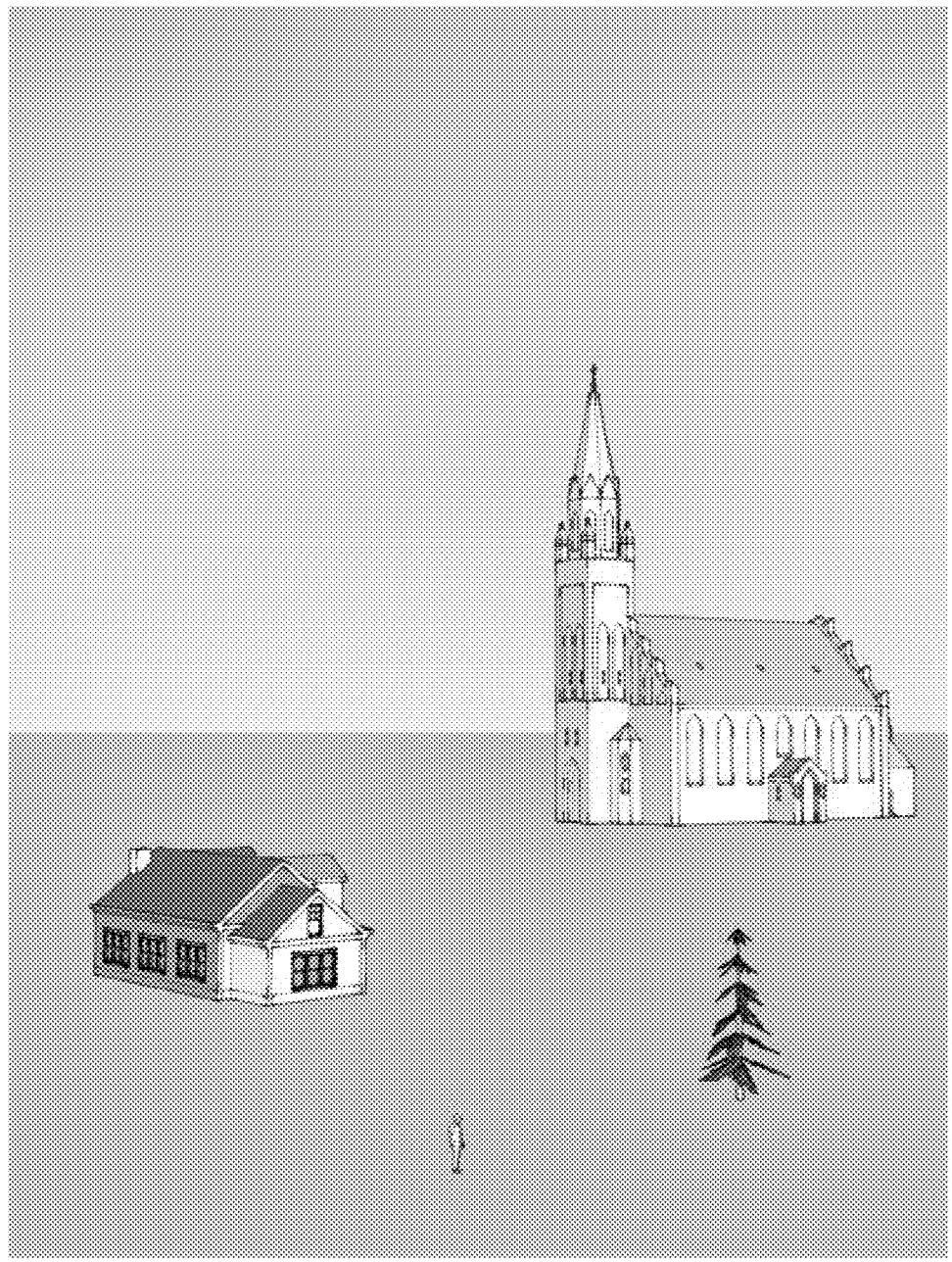
FIGS. 7 through 12 are exemplary illustrations of an improved video stream.

FIG. 6 shows one embodiment of a method for capitalizing on an augmented video stream. In one embodiment, the method begins with mapping 602 locations captured by a camera 102. As noted above, this mapping may be done using data structures. In other embodiments, image recognition algorithms are used. The method may also include approaching 604 proprietors of locations within the range of the camera 102 and which are captured in the video stream. The method may also involve arranging 606 for advertisements to appear in the video stream when the particular location is shown in the video stream. In certain embodiments, the advertisement includes details about the business at the location. The advertisement may also include coupons or other advertising materials.

The method may also involve displaying 608 advertising and information at positions on the video stream that are associated with the camera position and zoom level. Revenues may then be collected 610 from various businesses and entities that have agreed to pay for advertising in the video stream. In certain embodiments, the revenues from the advertising are shared 612 with the camera operator. The camera operator may be responsible for setting up and maintaining the camera at the particular location. The camera operator may simply allow another to set up the camera, and may take a portion of the revenues in return for the space provided for the camera.

FIGS. 7 through 12 show one embodiment of how an end user on a client 122a-c may interact with a camera 102. As discussed above, the end user may use the client 122a-c to connection to a website that transmits the video stream captured by the camera 102. The website may also provide additional tools to the end user allowing him/her to interact with the camera 102. In one embodiment, the video stream captured by the camera 102 shows the items shown in FIG. 7. The end user may interact with controls on the webpage to control the camera 102. For example, the end user may press an "up" control to pan the camera 102 up. The end user may be presented with corresponding "down," "left," and "right" buttons. The end user may also be presented with "zoom in" and "zoom out" buttons.

Figure 8:
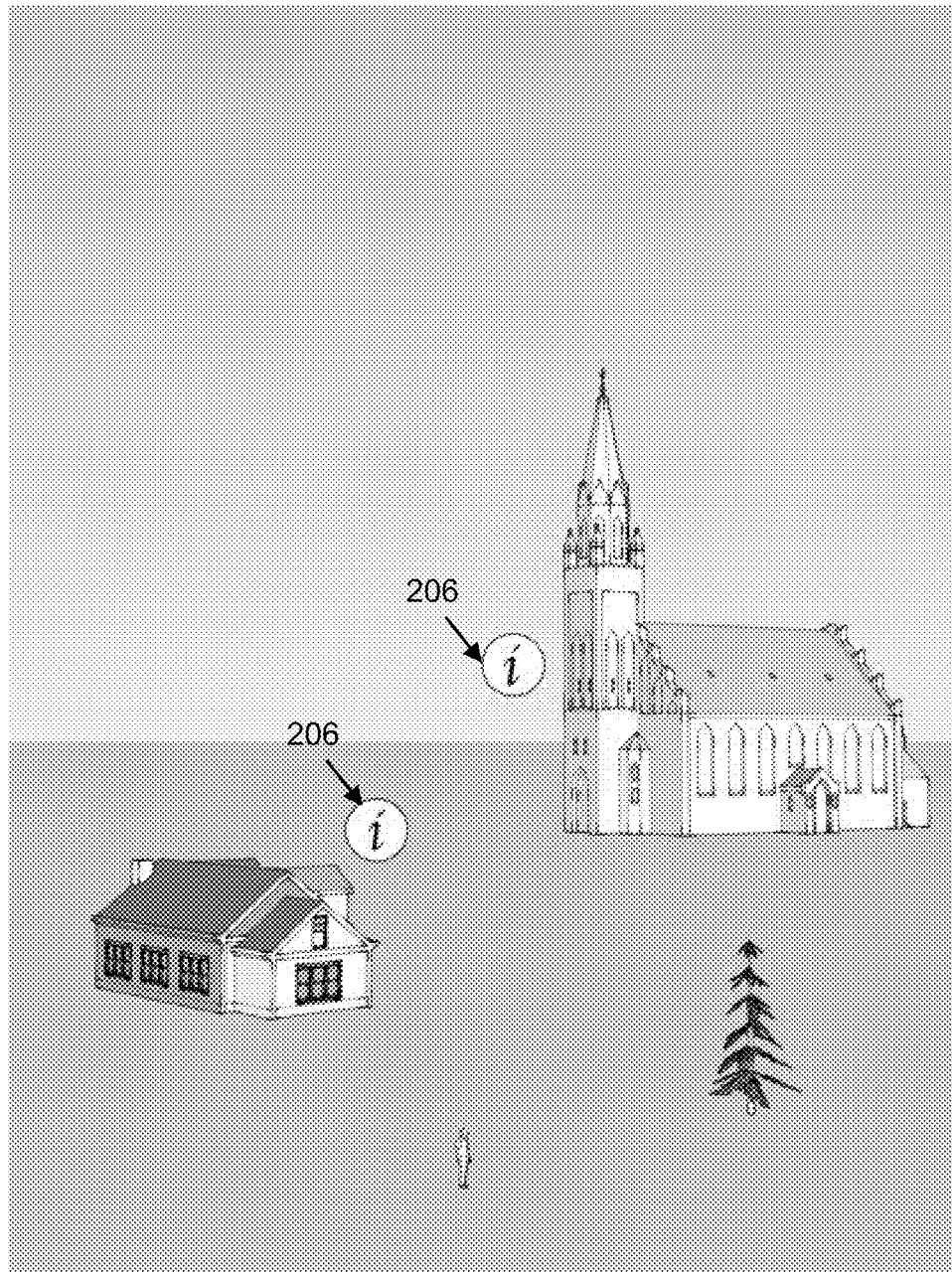

When the end user encounters an item that has been annotated, a tag 206 may appear. The tag 206 may be a visible indicator (as seen in FIG. 8), an audible indicator, some combination of the two, or some other indicator. In certain embodiments, if the end user leaves the camera 102 stationary for a period of time, the tags 206 disappear. The period of time may be preset. The tags 206 may reappear when the user changes the camera view (for example, by pressing one or more controls), or the zoom level.

Figure 9:
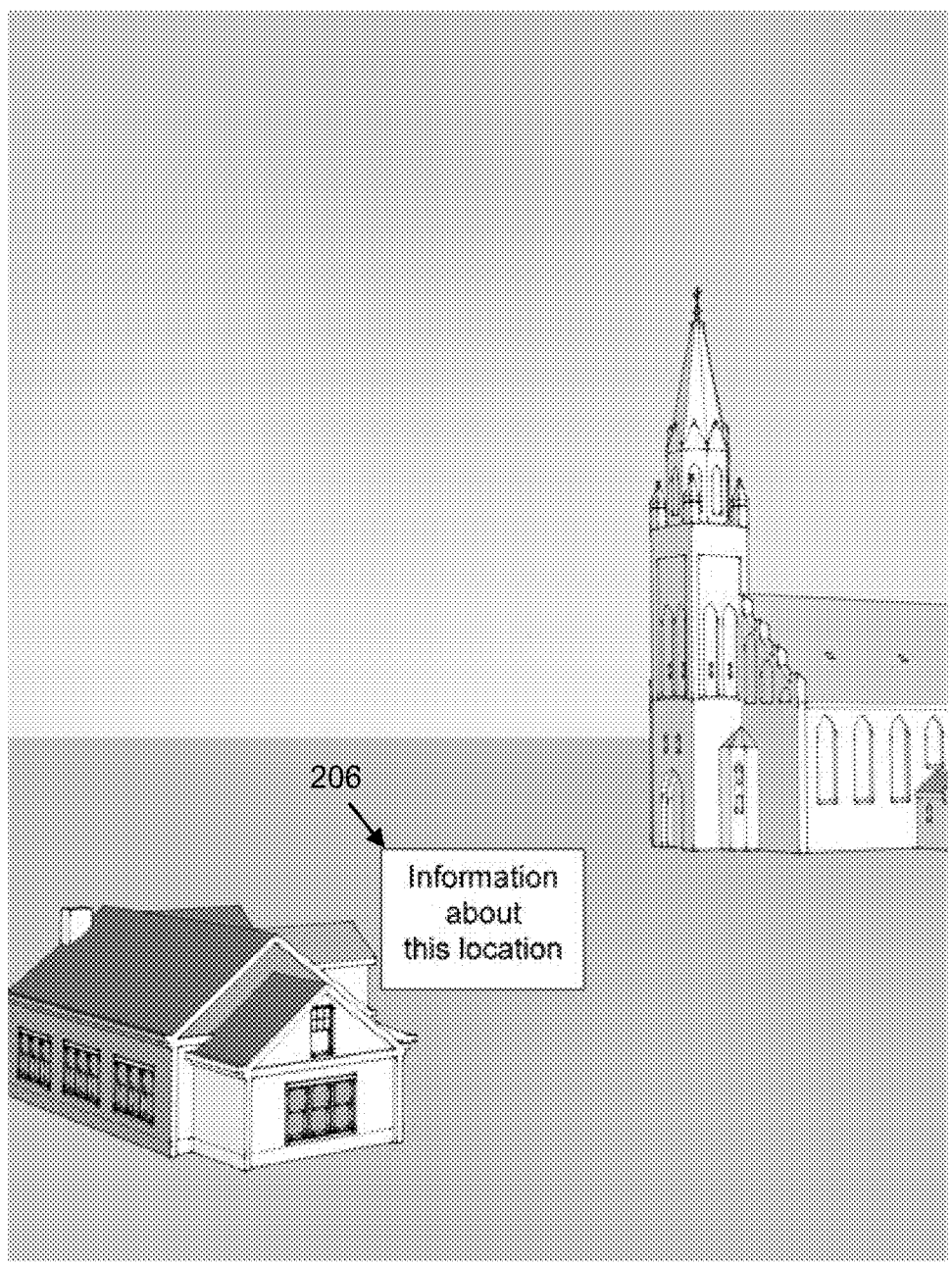
Figure 10:
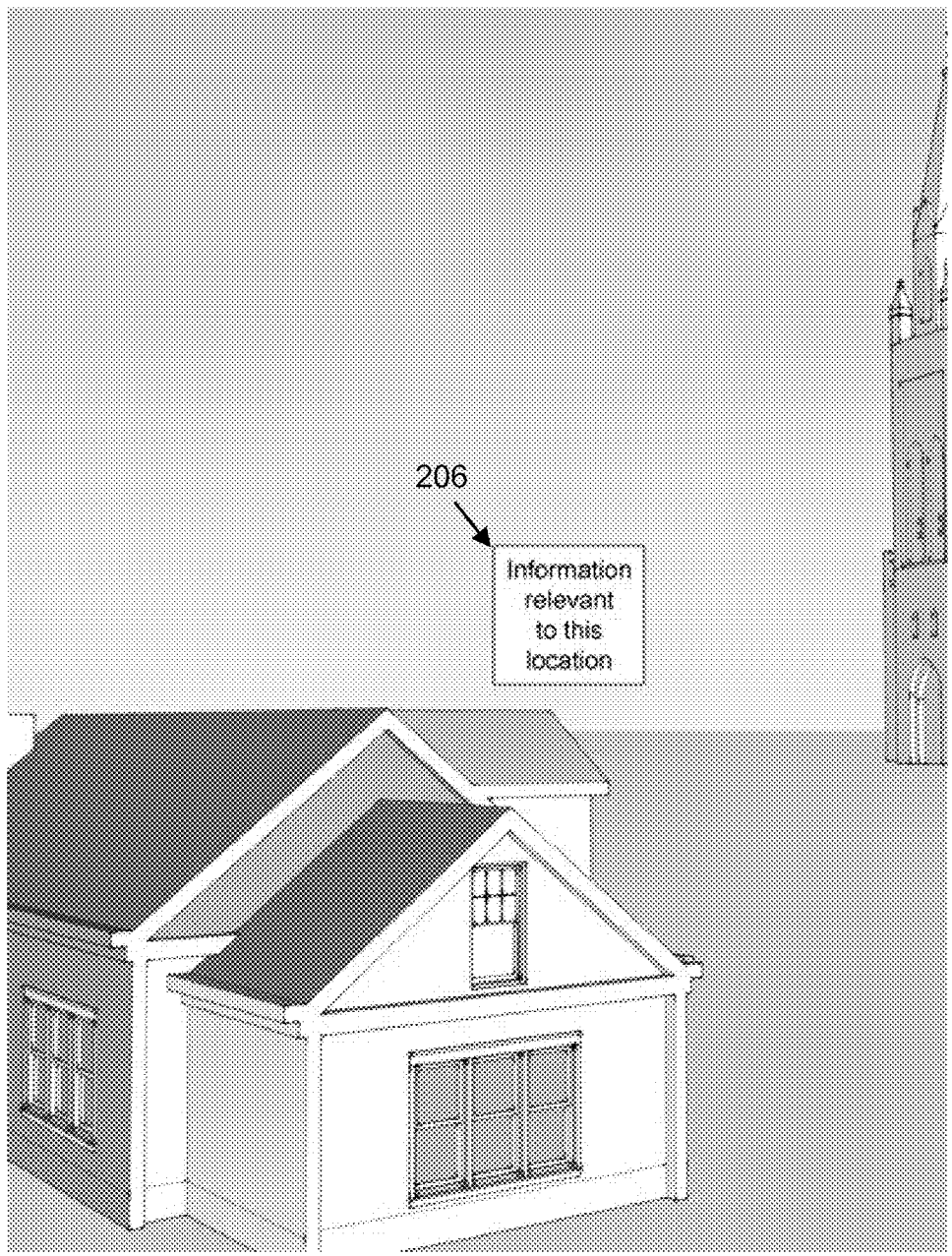
Figure 11:
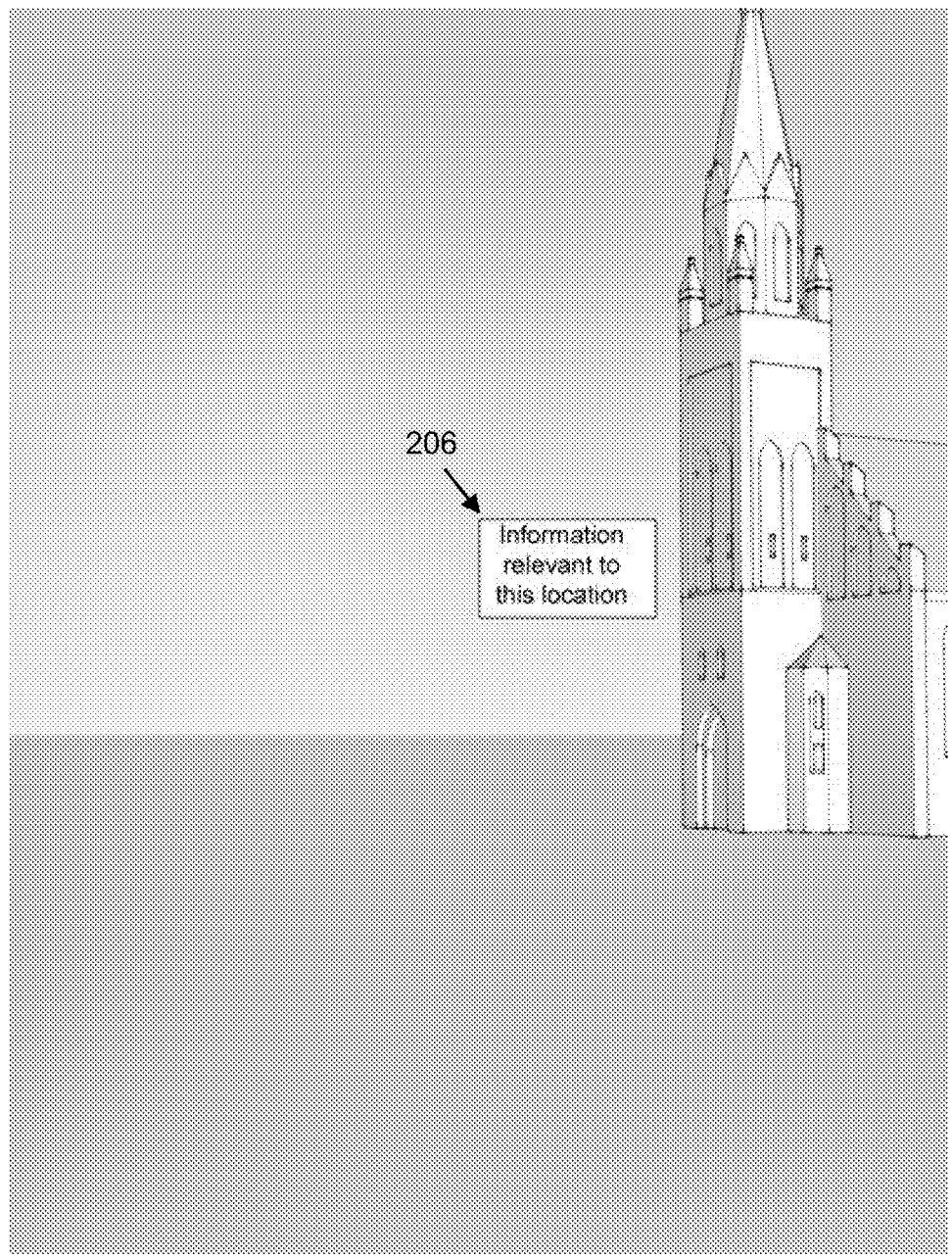
Figure 12:
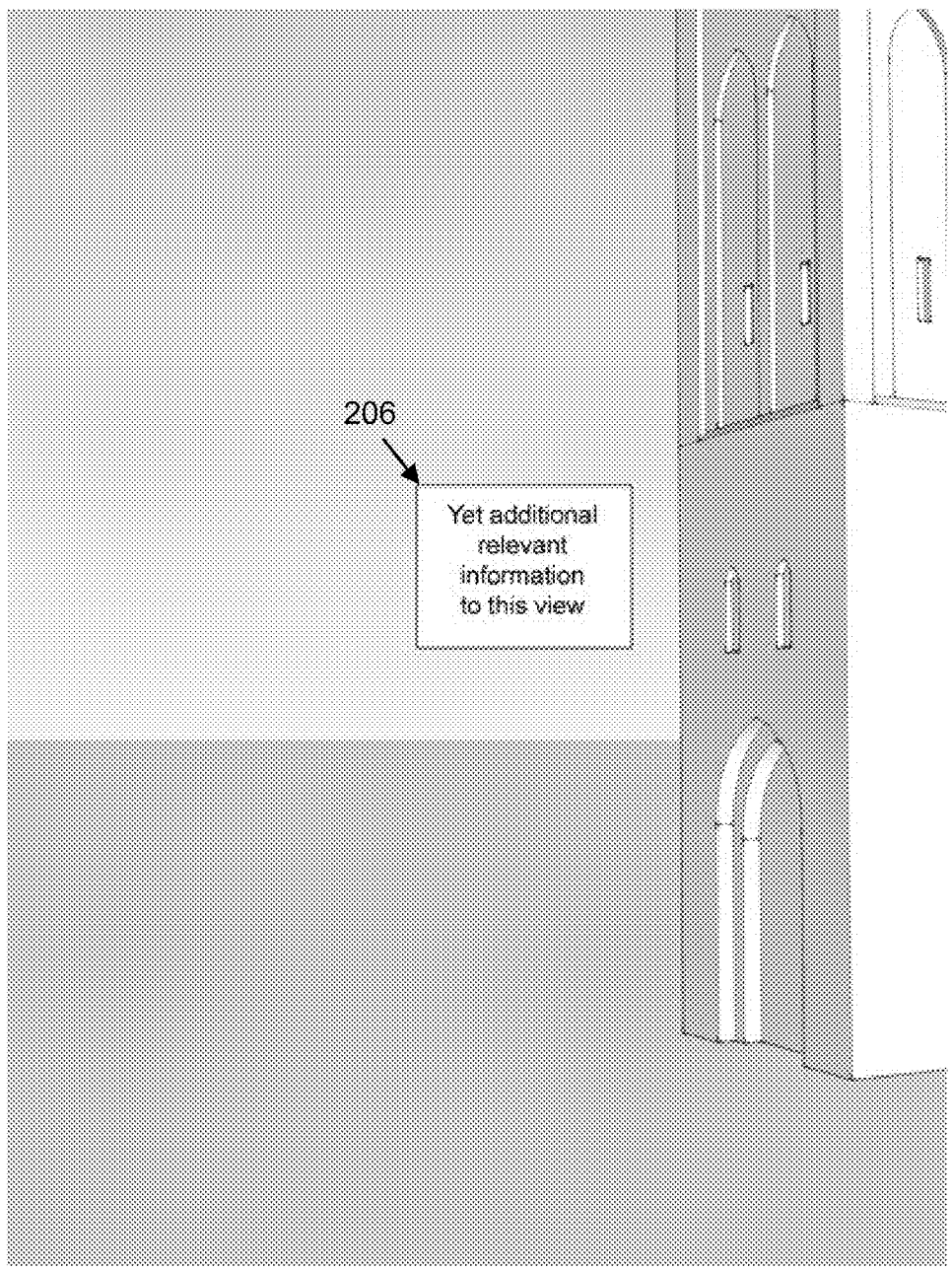

As the end user increases the zoom level, the information displayed in the tag 206 may change, as illustrated in FIGS. 9 and 10. For example, the amount of information presented to the end user may increase as the camera 102 zooms in. In certain embodiments, the information presented in the tag 206 becomes more and more specific as the camera 102 zooms in, and becomes more general as the camera 102 zooms out. FIGS. 11 and 12 show a similar change in the granularity of information presented in a tag 206 as the camera zooms in and out. In certain embodiments, the tag 206 includes identifying information at every zoom level. Thus, if an end user pans to a new building while the camera 102 is zoomed in, the end users still sees enough information to identify the building.

A similar approach may be used with tags 206 that include audio information. A general identification and introduction of a particular location may be provided at a first zoom level. More detailed information may be presented via audio as the camera 102 zooms in. Other approaches for presenting information to an end user may also be used.

Figure 13:
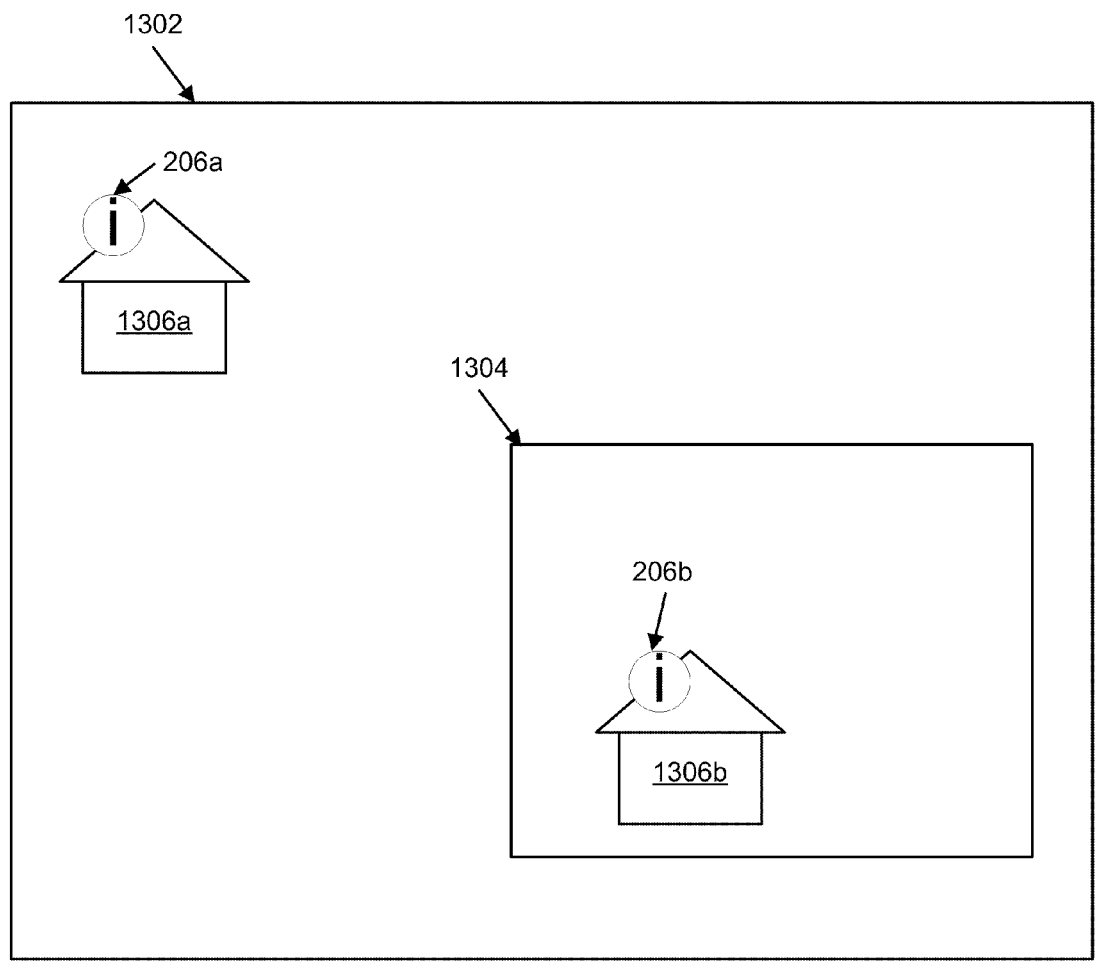
FIG. 13 is a representation of one embodiment of a map for associating tags with physical objects that can be viewed by the camera.

FIG. 13 shows one embodiment of an area map 1302 and a view 1304. The area map 1302 represents the area that the camera 102 can capture and the location of tags 206 within that area. The view 1304 is the portion of the area that the camera 102 can capture at a given time. The size of the view 1304 may change relative to the area and the area map 1302 as the camera 102 zooms in and out, which makes the camera 102 capture a view 1304 that is smaller or larger portion of the area. The area map 1302, represented visually in FIG. 13, may be a data structure that allows a computer to relate information about objects in the area map 1302 with the position of the camera 102.

The area map 1302 may be a layer that is superimposed over the video stream such that the images captured by the camera 102 and the tags 206 and other information in the area map 1302 appear to the user. In another embodiment, the area map 1302 includes a table of tags 206 with associated x-y-z coordinates. The video stream apparatus 106 may determine the x-y-z coordinates of the view 1304 and consult the table to insert the tags 206 at the appropriate locations within the video stream that represents the view 1304.

In one embodiment, the area map 1302 represents the area capturable by the camera 102 as a two-dimensional space. The area map 1302 may flatten the three-dimensional image captured by the camera 102 into the two-dimensional representation. The area map 1302 may associate tags 206 with particular locations of the area map 1302. For example, the house 1306a and the house 1306b may be fixed at the locations shown within the area map 1302. The area map 1302 may fix tags 206 to particular locations (such as the locations of the houses 1306a-b) using x-y coordinates or other approaches to associate the tags 206 with a particular location within the area map 1302. In other embodiments, the area may 1302 is a three-dimensional model with objects associated with particular x-y-z coordinates.

The view 1304 represents the section of the area that is captured by the camera 102. In certain embodiments, as the view 1304 moves, the changes in position of the camera 102 causing the movement of the view 1304 are noted. The video stream apparatus 106 may determine what sections of the area map 1302 are currently within the view 1304 and where they belong within the view 1304. The video stream apparatus 106 may display the tags 206 at appropriate locations based on where the view 1304 is within the area map 1302.

As noted above, the video module 410 may insert the tags 206 directly into the video stream by inserting the tags 206 into the frames of the video stream captured by the camera 102. The video module 410 may insert the tags 206 into the video stream by causing the tags 206 to appear over the video stream shown to the end user. For example, the video module 410 may cause the tags 206 to appear over the video stream as it is shown to the user without actually inserting the tags 206 into the frames.

In one embodiment, the area map 1302 is implemented as a hidden layer. The video stream apparatus 106 may display only those tags 206 within the hidden layer that are also within the boundaries of the view 1304. In FIG. 13, the tag 206b may be displayed to the user since it is within the view 1304, while the tag 206a is hidden from the user since it is outside of the view 1304. The area map 1302, in such an embodiment, may be curved to more accurately match tags 206 to objects in the video feed.

The video stream apparatus 106 may move the area map 1302 in response to the camera 102 moving. For example, if the camera 102 is sent a command to pan left, the video stream apparatus 106 may move the area map 1302 by an equivalent amount in the opposite direction from the movement of the camera 102. This approach may be used to make it appear to the user that the tags 206 are matched to the objects (such as the houses 1306) in the real-time video stream from the camera 102.

To implement such an embodiment, the video stream apparatus 106 may track the dimensions of the view 1304 of the camera 102 and the current X, Y, and Z coordinates of the camera 102. Changes to the position of the camera 102 cause a corresponding change in the position of the view 1304. In embodiments where the area map 1302 is a hidden layer, the hidden layer may be moved relative to the motion of the camera 102 to given the impression that the tags 206 are fixed at the positions shown in the video stream.

In certain embodiments, the area map 1302 adjusts the location of the tags 206 based on the zoom level of the camera 102. A camera 102 may not stay perfectly centered on an object as it zooms in on a point. As a result, this can cause a tag 206 to be improperly located as the camera 102 zooms in. The area map 1302 may thus be sensitive to zoom levels. In certain embodiments, during setup, the video stream apparatus 106 zooms in on each object in the area that is associated with a tag 206. The video stream apparatus 106 may take a plurality of samples of the location of the object as the camera 102 moves from a most zoomed out state to a most zoomed in state. In one embodiment, the video stream apparatus 106 takes ten samples. The video stream apparatus 106 may note the change in position of the object at each sample point and store this change information in the area map 1302. As a user zooms in on an object, the area map 1302 may adjust the locations of the tags 206 within the view 1304 to account for the changes in position of the objects within the view 1304, which changes in position result from zooming in. The video stream apparatus 106 may also use this depth information in the area map 1302 in order to determine what additional information should be displayed as the camera 102 zooms in and zooms out, as described above.

In certain embodiments, the video stream apparatus 106 uses a plurality of area maps 1302 that are associated with different zoom levels. As the camera 102 zooms in, the video stream apparatus 106 may switch from one area map 1302 to a second area map 1302 that is associated with the new zoom level.

Figure 14:
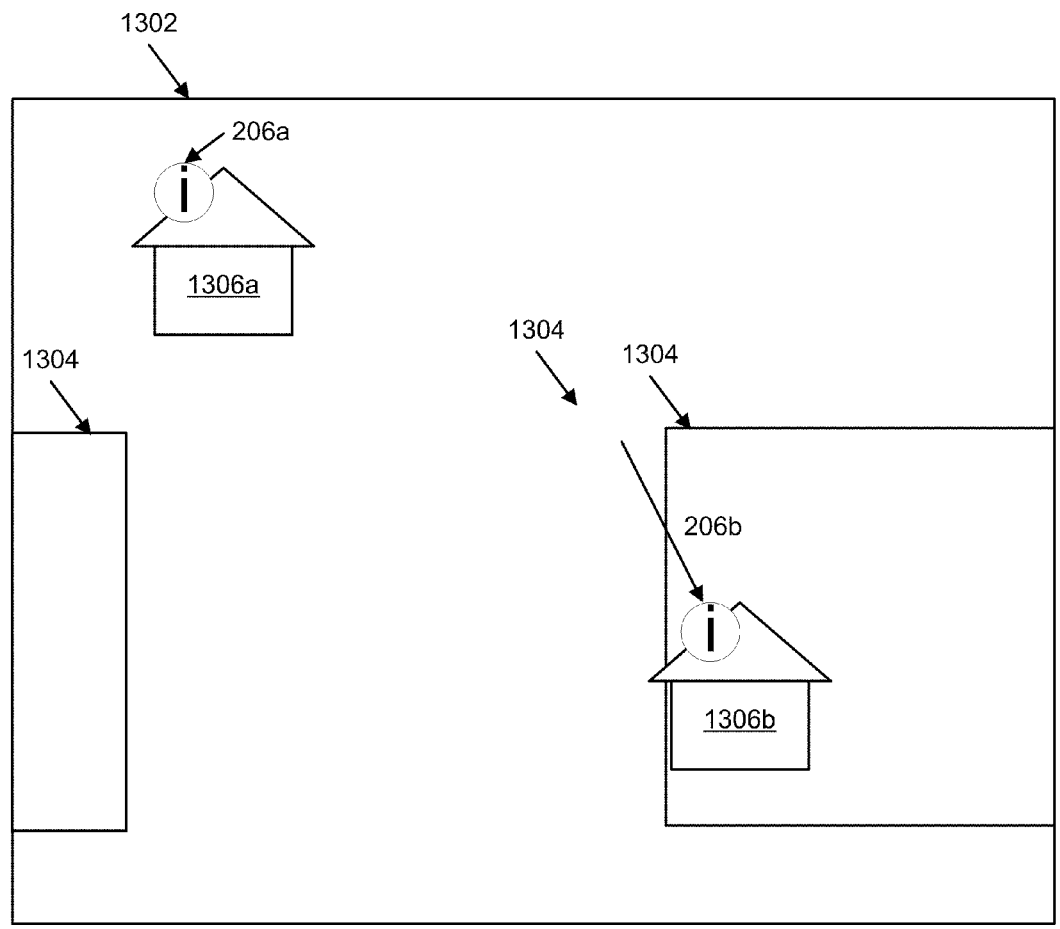
FIG. 14 is a second representation of a map for associating tags with physical objects that can be viewed by the camera.

FIG. 14 shows one embodiment of an area map 1302 that is implemented as a hidden layer. In certain embodiments, the camera 102 may have 360 degrees of rotation. As seen in FIG. 14, the video stream apparatus 106 may cause the area map 1302 to wrap around such that the full 360 degrees can be represented in the view 1304. Thus, when the view 1304 reaches an edge of the area map 1302, the view 1304 can wrap around to the other side, allowing full representation of the 360 degrees available to the camera 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising non-transitory computer readable media, the computer program product comprising instructions to: receive a video stream comprising a plurality of images of a first location taken by a camera at the first location; identify a physical object at the first location that appears in the video stream; identify a tag that is associated with the physical object, wherein the tag is an element that provides information about the physical object; insert the tag into the video stream such that the tag appears to a user receiving the video stream; receive directional input for the camera from a user of a remote computing device that is receiving the video stream; and change the position of the camera in response to receiving the directional input from the user remote computing device.

2. The computer program product of claim 1, wherein inserting the tag into the video stream further comprises inserting the tag at a location of the physical object in the video stream.

3. The computer program product of claim 1, wherein the tag is an interactive tag that provides additional information about the physical object when the interactive tag is selected by the user receiving the video stream.

4. The computer program product of claim 1, wherein the computer program product further comprises instructions to provide additional information about the physical object in response to a user zooming in on at least one of the tag and the physical object.

5. The computer program product of claim 1, wherein the computer program product further comprises instructions to receive a plurality of video streams, wherein each video stream is received from a unique camera at a unique location.

6. The computer program product of claim 1, wherein the computer program product further comprises instructions to further comprising maintain a queue of one or more users and allowing each user in the queue to submit the directional input, wherein only one user is permitted to submit directional input to the camera at a time.

7. The computer program product of claim 1, wherein the computer program product further comprises instructions to:
   identify a plurality of physical objects that appear in the images of the video stream; and
   identify, for each of the plurality of physical objects, one or more tags that provide information about the physical object.

8. The computer program product of claim 1, wherein the computer program product further comprises instructions to receive location data comprising at least one of position data indicative of where, within a field-of-view of the camera, the first location is located, and zoom data indicative of a zoom level of the camera, wherein the instructions to identify the physical object at the first location that appears in the video stream further comprises instructions to identify the physical object based on the location data.

9. The computer program product of claim 1, wherein the computer program product further comprises instructions to create a two-dimensional representation of an area viewable by the camera at the first location and associating one or more tags with locations on the two-dimensional representation.

10. The computer program product of claim 9, wherein inserting the tag into the video stream comprises displaying the tags in the two-dimensional representation over the video stream.

11. The computer program product of claim 1, wherein the computer program product further comprises instructions to insert a privacy tag into the video stream such that the privacy tag covers a sensitive object and obscures the sensitive object, and not allowing a user viewing the video stream to close the privacy tag.

12. A system comprising: a first camera at a first location that generates a first video stream comprising a plurality of images of the first location; a computer comprising a processor and memory, the computer configured to: receive the first video stream from the first camera; identify a physical object at the first location that appears in the images of the first video stream; identify a tag associated with the physical object; insert the tag into the first video stream such that the tag appears to a user watching the first video stream; transmit the first video stream comprising the tag to a second remote computer; receive directional input for the camera from a user of a second remote computing device that is receiving the video stream; and change the position of the camera in response to receiving the directional input from the user second remote computing.

13. The system of claim 12, wherein the computer is a server connected to the second remote computer by an Internet connection.

14. The system of claim 12, further comprising a plurality of cameras generating unique second video streams, wherein each camera is at a unique location.

15. The system of claim 14, wherein the computer is further configured to receive requests from users to view one or more of the first video stream and the second video streams.

16. The system of claim 15, wherein the computer is further configured to provide a graphical user interface (GUI) to the user in a web browser, the GUI allowing the user to select one of the first and second video streams.

17. A method for providing information in a video stream, the method comprising: receiving a video stream comprising a plurality of images of a first location taken by a camera at the first location; overlaying a two-dimensional map of an area viewable by the camera over the video stream, the two-dimensional map comprising a plurality of tags at locations on the two-dimensional map associated with physical objects, wherein a tag is an element that provides information about the physical object and that appears in the video stream; receive directional input for the camera from a user of a remote computing device that is receiving the video stream; and change the position of the camera in response to receiving the directional input from the user remote computing and moving the two-dimensional map in response to changes in a position of the camera such that the plurality of tags appear to users viewing the video stream at locations of associated physical objects in the video stream.

18. The method of claim 17, further comprising providing additional information about physical objects in response to the users zooming in on at least one of the tag and the physical object.

\* \* \* \* \*